Figure 6:
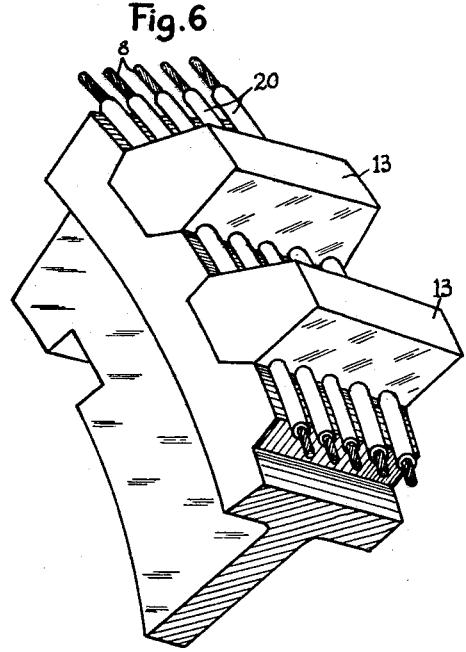

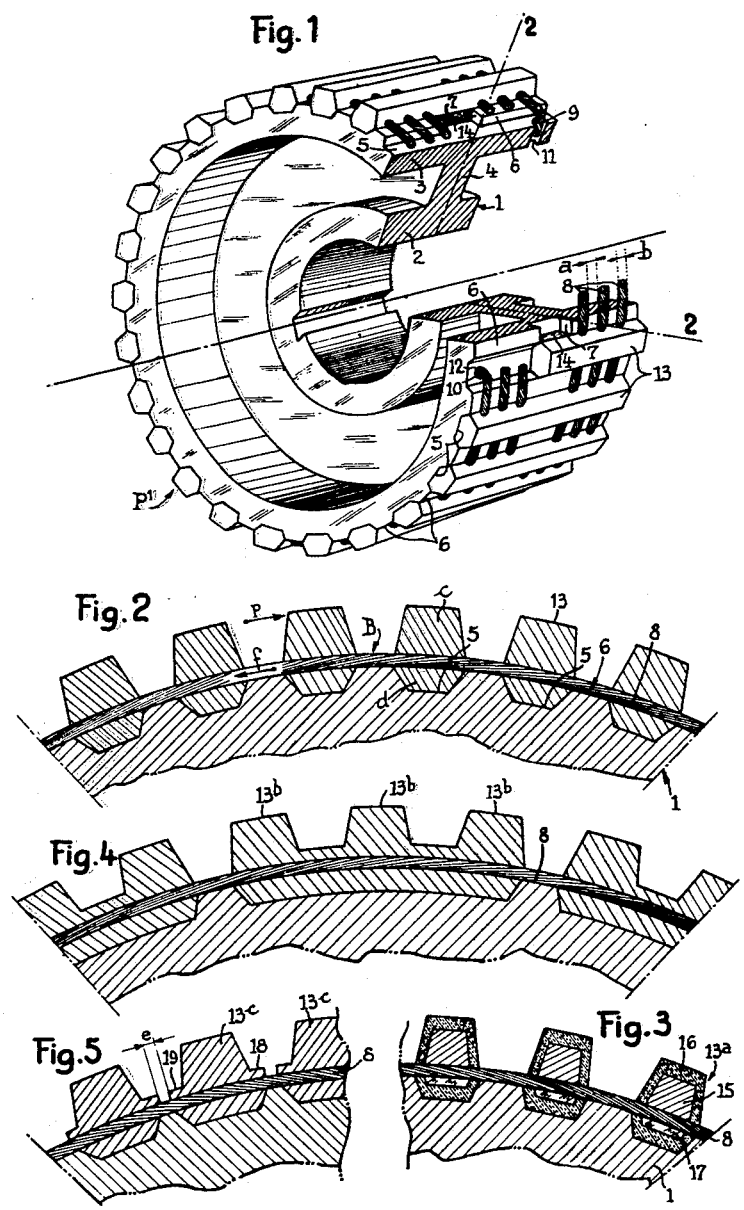

May 18, 1965 P. L. E. KUNTZMANN 3,183,734
TOOTHED WHEEL
Filed May 28, 1962 3 Sheets-Sheet 2

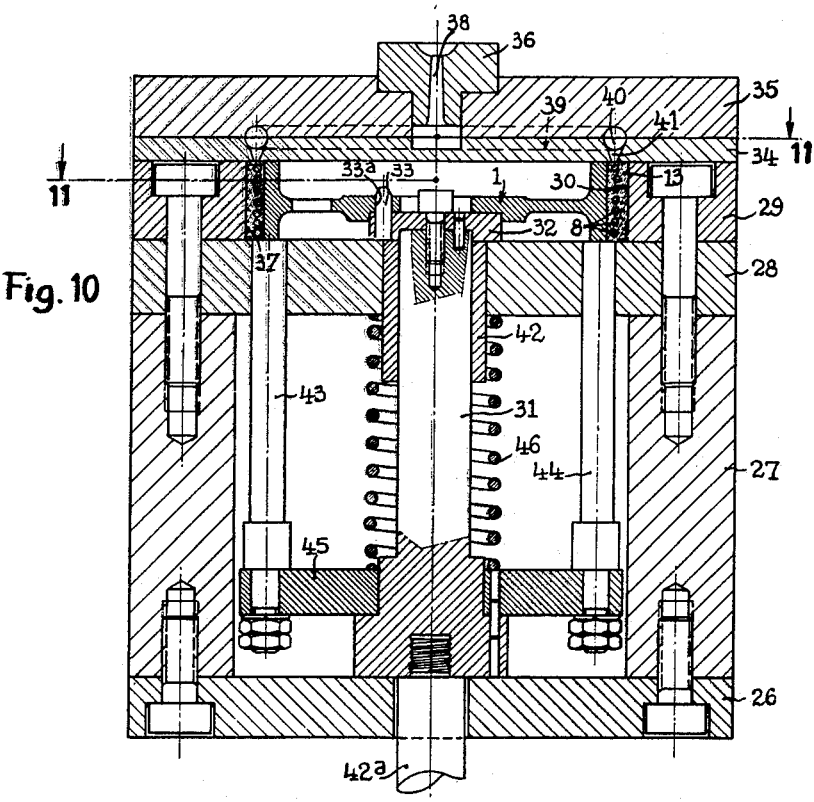
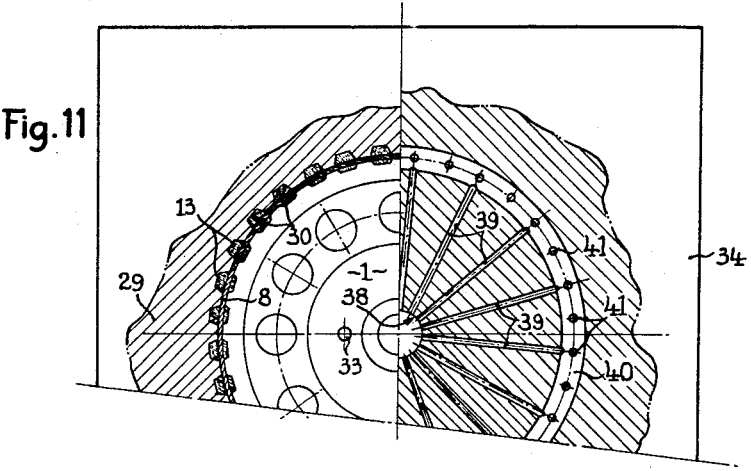

United States Patent Office 3,183,734
Patented May 18, 1965

3,183,734
TOOTHED WHEEL
Paul Louis Emile Kuntzmann, Villejuif, France, assignor to Compagnie des Transmissions Mecaniques Seine-Doubs-Isere, Levallois-Perret, Seine, France, a corporation of France
Filed May 28, 1962, Ser. No. 197,984
Claims priority, application France, June 10, 1961, 864,558, Patent 1,299,586
16 Claims. (Cl. 74—434)

The present invention relates to toothed transmission wheels.

It is known to employ in gear trains in toothed belt drives, gears or toothed wheels obtained by moulding plastic materials.

This solution is relatively costly owing to the fact that it is necessary to employ the same material for the teeth as for the body of the gear, whereas very often only the teeth need be composed of a special material. In other cases, the mechanical properties of the material employed for the teeth are quite unsuitable for a sufficiently rigid hub.

To overcome these various drawbacks mixed solutions have been proposed and composite toothed wheels or gears have been constructed with a metal hub and a toothed ring moulded thereon. But serious difficulties are then encountered. In general, plastic materials adhere imperfectly or even not at all to the metal hub. It is then necessary to form in the hub anchoring means having an undercut, for example of dovetail form, which seriously complicates the machining of the hub. A further drawback is that plastic materials are generally bad conductors of heat and consequently the heat generated by the rubbing of the teeth against each other when meshing cannot be dissipated. Moreover, as said plastic materials have a thermal coefficient of expansion distinctly higher than that of the metal, stresses arise in the anchoring means and variations in the pitch or the modulus rapidly result in destruction of the gear.

An object of the invention is to provide a composite toothed wheel or gear comprising in combination a centre member constituting a hub and composed of a hard, rigid and indeformable material, a continuous metal reinforcement disposed on the peripheral surface of said centre member, and teeth moulded on said reinforcement.

Owing to this reinforcement which remains bare between the successive teeth or groups of teeth these teeth or groups of teeth are practically independent of one another and are free to expand without any damage to the gear.

The reinforcement can be advantageously formed by coils or turns of a twisted cable.

Preferably, the exterior part of the teeth is of plastic material, as known per se.

Thus the remarkable frictional and elastic properties of plastic materials are associated with the rigidity of the metal hub which is bound by the metal reinforcement and this provides a gear having all the features of the constituent materials but lacking the defects inherent in plastic and metal composite elements.

Another object of the invention is to provide a mould for moulding the aforementioned toothed wheel or gear. In this mould, the cavities in the outer ring of the mould corresponding to the teeth of the toothed wheel or gear all communicate with a pouring passage through the medium of small apertures which, due to friction, result in a temperature rise in the plastic material employed and thereby insure a perfect fluidification of the latter and a suitable filling of the mould.

Further features and advantages of the invention will be apparent from the ensuing description, with reference to the accompanying drawings to which the invention is in no way limited.

In the drawings:
FIG. 1 is a perspective view with a part cut away of a toothed wheel or gear according to the invention;
FIG. 2 is a partial sectional view taken along the plane of symmetry 2—2 of FIG. 1;
FIGS. 3–5 are views similar to FIG. 2 of modifications of the invention;
FIGS. 6–9 are partial perspective views of various toothed wheels or gears according to the invention;
FIG. 10 is a longitudinal sectional view taken along the plane of symmetry of a mould for producing a toothed wheel or gear according to the invention, and
FIG. 11 is a partial sectional view taken along line 11—11 of FIG. 10.

In the embodiment shown in FIGS. 1 and 2, the gear or toothed wheel $P^1$ according to the invention comprises a centre member or hub 1 of for example steel, aluminium, or brass having a suitable radial sectional shape. It has, for example, a centre portion 2, a rim 3 and a web 4 interconnecting the latter and the portion 2. The rim 3 is provided with cavities 5 in the form of transverse recesses which alternate with bosses constituted by the ribs 6 notched at 7 by a turning operation.

A reinforcement or binding means rests on the bosses 6 and surrounds the peripheral surface of the rim 3; this reinforcement consists of a twisted cable 8 of any metal or metal alloy, such as brass, steel or copper. This cable is wound into relatively close but non-contacting coils, the space $a$ between each coil (FIG. 1) being preferably roughly equal to the diameter $b$ of the cable. This diameter is of about 1 mm. or more, depending on the application and the power to be transmitted. The cable has therefore two ends, shown at 9 and 10 in FIG. 1. When winding the cable, its end 9 for example is blocked in a cavity or aperture 11 provided in the rim 3 and the cable is wound in a regular manner on the hub under tension so that this cable is well applied against the bosses 6 and thus constitutes a flexible band round the hub. At the end of the cable winding, the cable is rigidly secured so as to be held under tension by engagement of its other end 10 in an aperture provided in the rim.

Transverse insert elements or teeth 13 adapted to mesh with a gear or a toothed belt are moulded onto the unit just described.

The teeth 13 have a generally bi-trapezoidal shape composed of two prismatic projections $c$ and $d$ (FIG. 2) located on either side of the reinforcement cable. The radial height of the projection $c$ which constitutes the tooth of the gear or toothed wheel, is preferably distinctly greater than that of the opposite projection $d$, the latter being provided to insure a good anchoring of the tooth on the cable, on the one hand, and in the peripheral cavities 5 of the rim 3 on the other.

The teeth 13 are independent of one another and completely surround the flexible reinforcement constituted by the cable, which, owing to its initial tension on the hub, maintains them strongly applied against the latter. Thus it is clear that if a force $p$ (FIG. 2) is applied on a tooth, this force, owing to the buttressing of the tooth in the cavity 5 of the rim 3, tends to tilt this tooth. As the latter is maintained in the cavity 5 by the tension of the reinforcement cable 8, the force $p$ results in an additional tension $f$ in the metal reinforcement. By virtue of the extreme flexibility of the reinforcement, this feature permits a very flexible operation of the gear, even if the teeth are constituted by a hard and rigid material. Further, the high mechanical characteristics of the metal reinforcement insure, irrespective of the operational conditions, a good rigidity of the composite unit forming the gear. In other words, the arrangement of the constituent elements of the gear allow slight temporary deformations of the toothing without adversely affecting its rigidity or its life.

As the teeth are independent from one another they can expand under the effect of a temperature rise without adversely affecting the rigidity of the assembly, since their anchoring relative to the rim of the hub is insured by the metal reinforcement 8 which has a coefficient of expansion due to heat very near to that of the hub but which extends elastically between the teeth so as to accommodate both the radial and circumferential expansions of the teeth.

The teeth are perfectly anchored, on the one hand, in the circumferential direction by virtue of the fact that they are inserted in the grooves 5 of the hub 1 and, on the other hand, in the axial direction, since when moulding the teeth the notches 7 of the ribs 6 of the hub are filled by a tenon 14 forming part of the adjacent tooth.

Owing to the very conception of the gear, the teeth 13 can be composed of any mouldable, castable or injectable material; for example any thermo-plastic or thermo-hardening synthetic material can be used and in particular the superpolyamides and like materials having a high wear resistance and a low coefficient of friction, a polymerized elastomer and even, if desired, a castable or mouldable metal or metal alloy, such as aluminium, bronze, brass or zamak.

If for technical reasons the teeth are made of a material only slightly resistant to wear, this defect can be overcome by placing on the surface of the tooth in the known manner a fabric of the jersey type having extensible stitches, this fabric being of surface treated threads or otherwise. When moulding the gear, this flexible fabric fully conforms to the shapes of the mould and in a way reinforces the outer profile of the teeth to which it is automatically welded. For this purpose it is advantageous to employ a knitted fabric from superpolyamide fibres previously treated or prestressed, or glass fibres. In another embodiment shown in FIG. 3, the teeth $13^a$ are formed by a core of metal or metal alloy 15 covered by a layer 16 of superpolyamide or polymerized elastomer. The metal core 15 of the tooth is then fixed to the cables by forming over, welding or brazing. In the case of forming over, the tooth can be made for example in the form of a prism having a trapezoidal cross-sectional shape and provided with two feet that are formed over at 17 against the reinforcement 8 after the latter has been wound on the hub 1.

When the gear or toothed wheel has a large diameter, it is sometimes of interest as concerns convenience of production to interconnect a certain number of teeth in groups, each group of teeth constituting an insert element which is independent of and separated from the following group or insert element by a bare portion of the reinforcement which thus permits, as mentioned hereinbefore, free movement to accommodate the expansions. In the embodiment shown in FIG. 4 the teeth $13^b$ are grouped in sets of three, but it is obvious that other teeth grouping could be employed if necessary.

If the gear meshes with a metal gear it might be feared that the crests of the teeth of the latter gear accidentally damage the metal reinforcement cables and consequently possibly cause its breakage or in any case adversely affect its mechanical properties. In this case it is advantageous to extend the two flanks of the insert elements or teeth $13^c$ (FIG. 5) in the form of flanges or ribs 18 and 19 which would encounter the teeth of the metal gear upon meshing of the two gears and thereby protect the reinforcement cable 8 from any damage. These ribs 18, 19 are relatively thin and have such width that they leave therebetween from one tooth to the following a free space $e$ having a width of about a few millimetres. Between the two ribs the profile of each tooth is bi-trapezoidal, as mentioned hereinbefore.

If in certain applications of the gear oxidation or corrosion phenomena are to be feared, there could be used as the material forming the reinforcement cable prestressed superpolyamide fibres which are surface treated or otherwise, or for example surface treated steel, brass, bronze or light alloy wires or inoxidizable steel wires. If the teeth are composed of superpolyamide, the cable could be provided with a thin coating or sheath of superpolyamide of the same type as that employed for the teeth. This sheath 20 (FIG. 6) can be obtained for example in a continuous die on an extruding machine in accordance with known methods. It thus very strongly adheres to the cable 8. As the material of the teeth 13 is the same as that of the sheath, when these teeth are injection moulded a surface melting of the sheath occurs and the teeth are welded thereon. Therefore the teeth are very strongly attached to the reinforcement 8.

Figure 7:
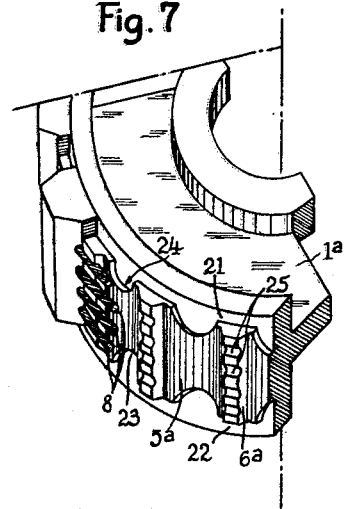
Figure 9:
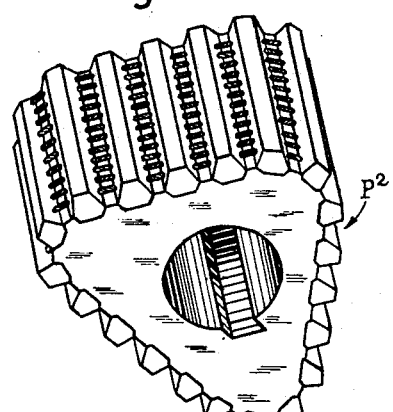

The present invention lends itself to various possible combinations which could be of interest in various applications. For example:

FIG. 7 shows a hub $1^a$ of tmetal or metal alloy cast or moulded under pressure, such as: aluminium, Zamak, bronze or brass. The hub comprises two circumferential recesses 21, 22 at each end of the ribs or bosses $6^a$ supporting the reinforcement 8, these recesses being extended at 23, 24 in the region of the recesses or grooves $5^a$ for transversely keying the teeth cast in these grooves. Further, a helical groove 25 is formed on the bosses $6^a$ to receive the cable 8 when the latter is wound on the hub.

Figure 8:
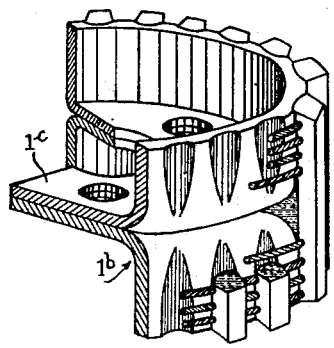

FIG. 8 shows a hub formed from two pressed-out members $1^b$, $1^c$ rigidly interconnected by welding or riveting.

The scope of the invention is not restricted to the circular shape of the gears of the foregoing examples; the gear can have a convex shape or even a curvilinear shape or a shape having flat portions. Thus the gear $P^2$ shown in FIG. 9 has in end elevation a curvilinear shape and rounded corners.

It must be understood that the described embodiments have been given merely by way of example and that it is possible to visualize and construct in accordance with the invention any arrangement other than one of those described for solving any particular problem.

There will now be described means for producing the gear according to the invention, it being understood that the invention is not intended to be limited to the method employed and this means, since other means can be employed without departing from the scope of the invention.

FIGS. 10 and 11 show a mould for producing the gear or toothed wheel having a reinforcement and attached teeth.

Fixed to a base plate or stand 26 is a circular ring 27 forming the base of the mould proper and permitting the housing of an ejection device described hereinafter. Fixed to this base is a plate 28 surmounted by a ring 29 having in its inner face recesses 30 provided for moulding the teeth of the gear. Further, a cylindrical central member 31 carries at its upper end a centering stud 32 for centering the hub of the gear to be produced, on which hub are wound the cables 8. A pin 33 extending through a hole $33^a$ in the hub 1 insures that the hub is correctly positioned in the mould. Disposed on the annular member or ring 29 is an injection plate 24 covered by a closing plate 35 provided with an injection nose 36.

The cavities 37 for moulding the teeth are provided between the members 28–29–37 and the hub 1 of the gear to be moulded. A centre pouring passage 38 communicates with a series of radial passages 39 formed in the upper face of the plate 34 and these passages communicate with an annular passage 40 formed between the injection plate 34 and upper plate 35 of the mould. Apertures 41 in the form of a truncated cone and having a diameter of about 0.5 mm. and being provided in a number equal to the number of the teeth desired for the gear, each put in communication the annular passage 40 with a cavity 37 provided for moulding a tooth.

With the mould assembled in the illustrated manner, the superpolyamide or other plastic material enters in the fluid state—by way of the central passage 38, the radial passages 39, the passage 40 and the apertures 41—the cavities 37. The rubbing in the apertures 41 raises its initial temperature, which in the case of superpolyamide rises from 220° C. to about 280° C., thereby affording a complete fluidification of the material which fully fills the cavities 37 and even enters the interstices left by the twisted strands of the cable and thereby ensures after solidification a perfect anchoring of the teeth on the reinforcement.

After the plastic material has set, the gear is removed from the mould by first raising the closing plate 35 carrying the injection nose 36 and this permits moving the injection core which has solidified in the conical passage 38, the passages 39, the passage 40 and the conical apertures 41. Thereafter, the injection plate 34 is removed. In exerting a vertical upward pressure on a pin 42$^a$ connected to the centering member 31, the latter is upwardly shifted in a guide sleeve 42 which is a force fit in the plate 26 and the moulded gear is raised.

To facilitate removal of the gear from the mould, two ejection bars 43 and 44 secured to a circular plate 45 centered on the member 31 and maintained in position by a helical spring 46, moves at the same time as the central member 31 and consequently exerts a pressure on the rim of the hub of the gear thereby removing the gear from the mould easily and without deformation.

Although specific embodiments of the invention have been described, many modifications and changes may be made therein without departing from the scope of the invention as defined in the appended claims.

Thus the flexible reinforcement could be if desired formed of juxtaposed endless cable loops or of an endless steel band which is perforated or notched on the edges.

Having now described my invention what I claim as new and desire to secure by Letters Patent is:

1. A gear wheel having an axis of rotation and comprising a center element which constitutes a hub having a peripheral face provided with a plurality of recesses arranged about said axis, said recesses extending substantially parallel to said axis and in circumferentially spaced relation to each other, insert elements arranged about said axis and engaged in the recesses so as to be rigid with the center element with regard to rotation about said axis, said center element adjacent of said insert elements defining spaces therebetween to allow for expansion of said elements, a reinforcement element extending about said axis and completely encompassing the center element and extending transversely of the insert elements, the insert elements including outer gear teeth extending radially outwardly of the reinforcement element and constituting the gear teeth of the gear wheel and the insert elements being engaged between the center member and the reinforcement element so that the reinforcement element retains the insert elements in the recesses.

2. A gear wheel as claimed in claim 1, wherein each insert element has only one tooth thereon.

3. Toothed wheel as claimed in claim 1, wherein each insert element has a plurality of teeth thereon.

4. A gear wheel having an axis of rotation and comprising a rigid center element which constitutes a hub having a peripheral face provided with recesses and bosses interposed between the recesses, the recesses and bosses being arranged about said axis and extending substantially parallel to said axis, a reinforcement element extending about said axis and completely encompassing the center element to rest on the bosses and span the recesses, insert elements arranged in spaced relation to each other about said axis and engaged in the recesses so as to be rigid with the center element with regard to rotation about said axis, each insert element including an outer gear tooth extending radially outwardly of the reinforcement element, the gear teeth of the insert elements constituting the gear teeth of the gear wheel, the insert elements extending transversely of the reinforcement element between the latter and the corresponding recess so as to be keyed by the reinforcement element and thus retained in the corresponding recess, said spaced relation of the insert elements providing spaces between adjacent insert elements in which the reinforcement element is exposed.

5. A gear wheel having an axis of rotation and comprising a rigid center element which constitutes a hub having an annular peripheral face provided with recesses and ribs interposed between the recesses, the recesses and ribs being arranged about said axis and extending in directions substantially parallel with said axis, a substantially thread-shaped reinforcement element extending about said axis and tightly and completely encompassing the center element so as to bear firmly against the ribs and span the recesses, insert elements arranged in circumferentially spaced relation to each other about said axis and engaged in the recesses so as to be rigid with the center element with regard to rotation about said axis, each insert element including an outer gear tooth located on a circle centered on said axis and having a cubed bore coaxial with said axis, the reinforcement element extending through the bores of the insert elements so as to key the insert elements and retain the same in the corresponding recesses, said spaced relation of the insert elements providing spaces between adjacent insert elements in which the reinforcement element is exposed, the teeth of the insert elements extending radially outwardly of the reinforcement element and constituting gear teeth of the gear wheel.

6. A gear wheel having an axis of rotation and comprising a rigid center element which constitutes a hub having an annular peripheral face provided with recesses and ribs interposed between the recesses, the recesses and ribs being arranged about said axis and extending in directions substantially parallel with said axis, a substantially thread-shaped reinforcement element extending helically about said axis and coaxial with the center element to tightly and completely encompass the center element so as to bear firmly against the ribs and span the recesses, insert elements arranged in circumferentially spaced relation to each other about said axis and engaged in the recesses so as to be rigid with the center element with regard to rotation about said axis, each insert element including an outer gear tooth located on a circle centered on said axis and having a portion which extends transversely of the reinforcement element between the center element and the reinforcing element so as to be keyed by the reinforcement element and thus radially retained in the corresponding recess, said spaced relation of the insert elements providing spaces between adjacent insert elements in which the reinforcement element is exposed, the gear teeth of the insert elements extending radially outwardly of the reinforcement element and constituting the gear teeth of the gear wheel.

7. A gear wheel as claimed in claim 6, wherein the helically extending reinforcement element comprises a plurality of spires under tension and has two ends engaged with the center element so as to be rigid with the center element with regard to rotation about said axis and thereby maintain said tension.

8. A gear wheel as claimed in claim 6, comprising grooves formed in said ribs and in which said helically extending reinforcement element is engaged, whereby the reinforcement element is retained axially of the centre element.

9. A gear wheel having an axis of rotation and comprising a metal center element having an annular peripheral face provided with grooves and ribs interposed between the grooves, the grooves and ribs being arranged about said axis and extending in directions parallel with said axis, a metal cable extending helically about said axis in a plurality of coils coaxial with the center element and tightly encompassing the center element to bear firmly against the ribs and span the grooves, gear tooth elements composed of plastic and arranged in circumferentially spaced relation to each other about said axis and respectively engaged in the grooves, each tooth element being engaged in its corresponding groove in such manner as to be rigid with the center element with regard to rotation about said axis but freely extractable from the groove radially of said axis and having a portion in the groove which is located between the center element and the metal cable spanning the groove so as to be keyed by the metal cable and consequently retained in the groove, the metal cable being exposed between the circumferentially spaced tooth elements.

10. A gear wheel as claimed in claim 9, wherein each tooth element is engaged in its corresponding groove by a portion of the tooth element which is convergent toward said axis.

11. A gear wheel as claimed in claim 9, wherein each tooth element comprises a circumferentially extending integral flange on both sides of the tooth element which overlaps a part of the metal cable and protects it from the teeth of a toothed structure that the toothed wheel is adapted to engage, a small gap between the adjacent flanges of adjacent tooth elements exposing a small portion of the metal cable.

12. A gear wheel as claimed in claim 9, wherein each tooth element is engaged with the corresponding groove on a surface of contact which has such shape as to prevent movement of the tooth element in a direction parallel with said axis.

13. A gear wheel having an axis of rotation and comprising a center element, peripheral transmission tooth elements, and securing means securing the tooth elements to the center element, the securing means comprising, on one hand, interengaging faces which extend in directions substantially parallel with said axis and are provided respectively on the tooth elements and center element and render the tooth elements rigid with the center element as regards rotation about said axis but allow the tooth elements to be detached from the center element radially of said axis and, on the other hand, binding means extending completely around the center member and through the tooth elements so as to maintain said faces on the tooth elements and center element in interengagement, the gear tooth elements having portions which extend radially outwardly of the binding means and constitute the gear teeth of the gear wheel.

14. A gear wheel having an axis of rotation and comprising a metal center element having an annular peripheral face provided with grooves and ribs interposed between the grooves, the grooves and ribs being arranged about said axis and extending in directions parallel with said axis, a metal cable extending helically about said axis in a plurality of coils and tightly encompassing the center element so as to bear firmly against the ribs and span the grooves, gear tooth elements composed of plastic and arranged in circumferentially spaced relation to each other about said axis and respectively engaged in the grooves, each tooth element being engaged in its corresponding groove in such manner as to be rigid with the center element as regards rotation about said axis but freely extractable from the groove, each tooth element having a metal core which has portions extending transversely of the metal cable between the latter and the center element so that the metal core is retained by the metal cable.

15. A gear wheel having an axis of rotation and comprising a rigid center element which constitutes a hub having an annular peripheral face provided with recesses and ribs interposed between the recesses, the recesses and ribs being arranged about said axis and extending in directions substantially parallel with said axis, a substantially thread-shaped reinforcement element extending helically about said axis and tightly encompassing the center element so as to bear firmly against the ribs and peripheral recesses provided in the ribs and communicating with the grooves, the tooth elements having circumferentially extending projection portions which engage said peripheral recesses and key the tooth elements against movement in a direction parallel with said axis.

16. In a toothed mechanical transmission wheel having an axis of rotation, a metal center element having an annular peripheral face provided with grooves and ribs interposed between the grooves, the grooves and ribs being arranged about said axis and extending in directions parallel with said axis, a metal cable extending about said axis in a plurality of helical coils coaxial with the center element and tightly encompassing the center element so as to bear firmly against the ribs and span the grooves, a sheath of plastic enclosing the metal cable, tooth elements composed of plastic and arranged in circumferentially spaced relation to each other about said axis and respectively engaged in the grooves, each tooth element being engaged in a corresponding groove in such manner as to be rigid with the center element as regards rotation about said axis but freely extractable from the groove radially of said axis and having a portion in the groove which is located between the groove and the metal cable spanning the groove so as to be keyed by the metal cable and consequently retained in the groove, the sheathed metal cable being exposed between the circumferentially spaced tooth elements and the sheath of plastic constituting a continuous integral structure of plastic with said plastic tooth elements.

References Cited by the Examiner
UNITED STATES PATENTS

| | | | |
|---|---|---|---|
| 597,907 | 1/98 | Jackson | 74—461 |
| 977,300 | 11/10 | Haines. | |
| 1,765,231 | 6/30 | Haas | 74—460 |
| 2,111,590 | 3/38 | Hoof | 74—445 |
| 2,360,011 | 10/44 | Popp. | |
| 2,595,829 | 5/52 | Dean. | |
| 2,704,465 | 3/55 | Haller | 74—434 |
| 2,733,479 | 2/56 | English. | |
| 2,764,900 | 10/56 | Warsmith | 74—434 |
| 2,873,088 | 2/59 | Neumann | 253—77.2 |
| 2,874,583 | 2/59 | Platt. | |

OTHER REFERENCES

Dupont Journal of Teflon, Vol. 4, May 1963, 103–1142, Teflon.

DON A. WAITE, *Primary Examiner.*